United States Patent
Martineau

(10) Patent No.: US 7,128,175 B1
(45) Date of Patent: Oct. 31, 2006

(54) MULTI-TERRAIN AMPHIBIOUS VEHICLE

(76) Inventor: Duane G. Martineau, 41848 Deepwood Ct., Temecula, CA (US) 92591

( * ) Notice: Subject to any disclaimer, the term of this patent is extended or adjusted under 35 U.S.C. 154(b) by 212 days.

(21) Appl. No.: 10/767,086

(22) Filed: Jan. 29, 2004

(51) Int. Cl.
*B62D 57/02* (2006.01)
(52) U.S. Cl. .................. 180/7.1; 180/22; 440/12.66
(58) Field of Classification Search ............ 180/7.1, 180/7.4, 8.1, 8.2, 24.02, 22, 24.11; 152/416; 440/12.54, 12.66; D12/3; 301/5.1
See application file for complete search history.

(56) References Cited

U.S. PATENT DOCUMENTS

| | | | | |
|---|---|---|---|---|
| 3,054,467 A | * | 9/1962 | Seiler | 180/20 |
| 3,372,766 A | * | 3/1968 | Lifferth | 180/7.1 |
| 3,421,472 A | * | 1/1969 | Oberg | 114/344 |
| 3,435,798 A | * | 4/1969 | Rieli | 440/12.66 |
| 3,895,596 A | * | 7/1975 | Amour | 440/12.66 |
| 5,881,831 A | * | 3/1999 | Harvey | 180/6.2 |
| 5,993,273 A | * | 11/1999 | Adams | 440/5 |

FOREIGN PATENT DOCUMENTS

FR          2600944      *  1/1988

* cited by examiner

*Primary Examiner*—Anne Marie Boehler
(74) *Attorney, Agent, or Firm*—Charles C. Logan, II

(57) ABSTRACT

A multi-terrain amphibious vehicle for travel across various types of surfaces and upon various bodies of water. The vehicle has an elongated longitudinally extending chassis having a bottom surface having a centerline. A plurality of left side propulsion units and a plurality of right side propulsion units extend inwardly toward the centerline and they are supported by the chassis. A vehicle body having a passenger compartment is mounted on the chassis. A source of drive power is mounted on the chassis. Power transmission structure connects the drive power structure to the driven axles of the respective left and right side propulsion units. The propulsion units each have a plurality of cam-shaped wheels mounted on each driven axle. The cam-shaped wheels are oriented on the driven axle so that there will always be an arcuate perimeter segment of one of the cam-shaped wheels positioned to contact the ground surface during each 360 degree rotation of the driven shaft.

14 Claims, 5 Drawing Sheets

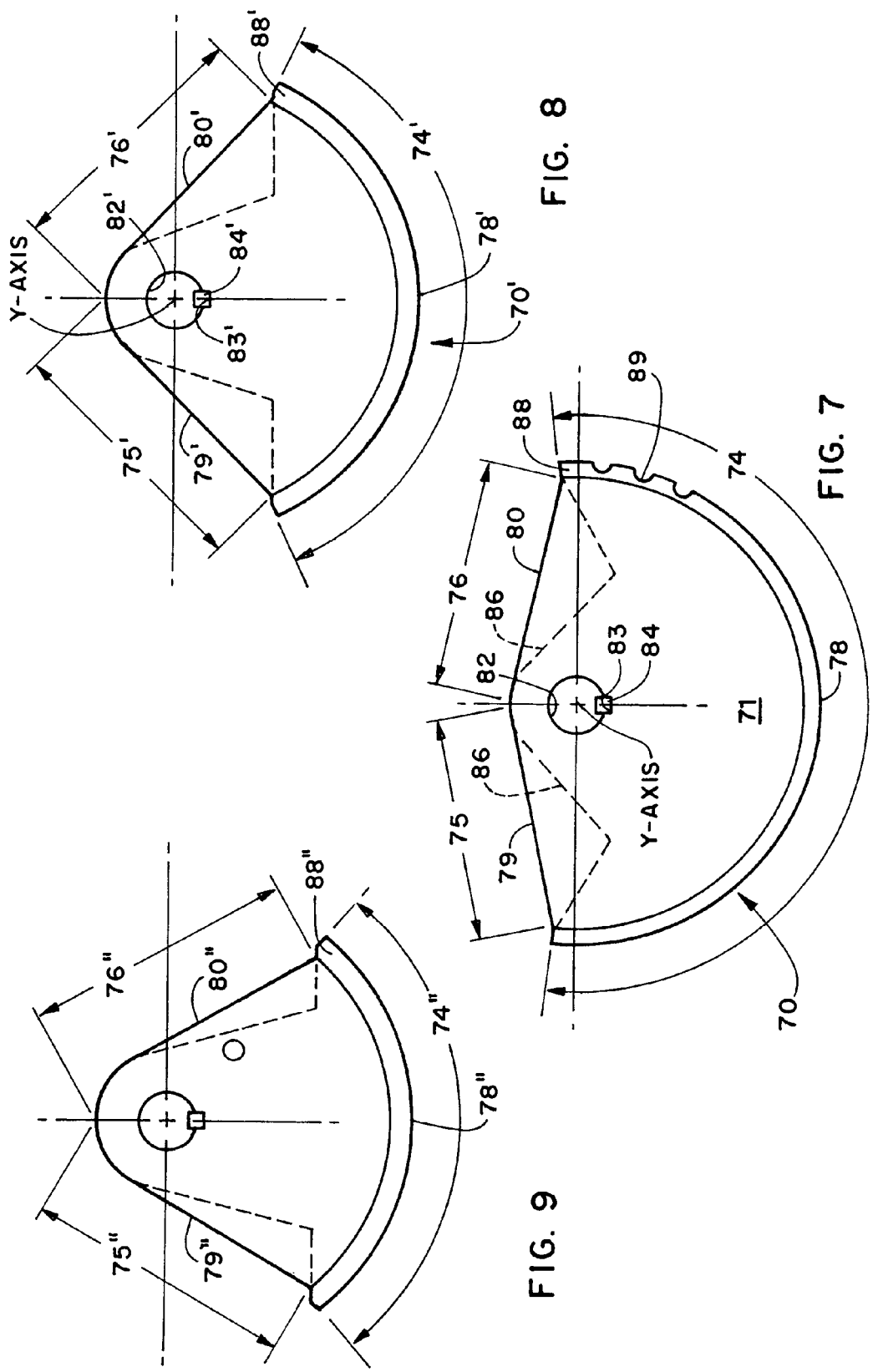

MULTI-TERRAIN AMPHIBIOUS VEHICLE

BACKGROUND OF THE INVENTION

The invention relates to vehicles capable of traveling across various types of surfaces. More specifically, it is directed to a multi-terrain amphibious vehicle that may efficiently propel itself across bodies of water and effectively traverse both even and uneven terrain without substantial loss of traction. The vehicle is capable of crossing from one type of surface to another without undue interruption during the transition.

In many applications of surface vehicles, both military and non-military, the vehicle is likely to encounter widely varied types of surfaces in transporting its payload. It may not only encounter both water and land surfaces, it may encounter land surfaces of greatly varied terrain and surface characteristics. In most cases, time and other resource constraints do not permit avoidance measures by which the vehicle may circumvent or otherwise avoid operation on surfaces for which the vehicle is not particularly suited. Consequently, the unexpected characteristics of the surface to be traversed often make for insurmountable obstacles which delay, if not all together halt, the vehicle's mission. Even where the vehicle is capable of traversing different types of surfaces encountered, efficient traversal may not be possible because significant reconfiguration of one or more parts of the vehicle would be necessary if it is to continue its travel across a surface of significantly different attributes.

Accordingly, there is a need for a versatile vehicle which is equally adept at traveling not only through water and on land surfaces, but also land surfaces of widely varied attributes such as unevenness, hardness, and salinity. There is also a need for a vehicle capable of overcoming abrupt transitions and surface characteristics without the accompanying need to incur undue interruptions in the vehicles operation.

Amphibious vehicles capable of traveling across both water and land surfaces are known in the prior art. The Hensley U.S. Pat. No. 1,100,238 discloses a combination automobile/boat vehicle. It has propeller wheels capable of travel over land as well as water. The wheels are mounted on shafts each having a sprocket gear driven by a gasoline engine. The Nelson U.S. Pat. No. 3,418,960 relates to vehicle wheels that are particularly adapted for amphibious vehicles when traveling on ground such as water saturated soil, sand or shingle, in which normal wheels tend to spin and sink and for the propulsion of such vehicles when on a body of water. At least ten different forms of wheels that could be used are illustrated in the various figures and they are described in the specification. All of these wheels have a basic circular outer radial surface and they rotate about a central axis.

The Headrick U.S. Pat. No. 3,628,493 discloses impeller wheels for amphibious vehicles. The Wakayama et al U.S. Pat. No. 4,575,354 discloses a toy car having detachable non-circular wheels attached to an axle driven by a spring motor.

The Siren U.S. Pat. No. 4,878,451 is directed to an amphibian vehicle having a plurality of wheels mounted on each side. Two drive trains are provided for separately driving the wheels on the respective sides of the hull. The drive trains can be driven at differential speeds to steer the vehicle.

The Legoy et al U.S. Pat. No. 5,013,269 is directed to a modular navigation vessel equipped with rotating floats.

The Harvey U.S. Pat. No. 5,881,831 is directed to a multi-terrain amphibious vehicle having a plurality of non-circular propulsion members rotatably coupled to a chassis assembly for propelling the vehicle across a given surface. That vehicle includes a control mechanism for controlling the rotational velocities and phases of the respective propulsion members such that the propulsion members are cooperatively rotated to collectively impart a predetermined speed and direction of travel to the vehicle.

SUMMARY OF THE INVENTION

It is an object of the invention to provide a novel multi-terrain and amphibious vehicle having structure that provides traction that utilizes all the benefits of a wheel, the traction of a track and inverted paddles for water propulsion.

It is also an object of the invention to provide a novel multi-terrain amphibious vehicle that utilizes unique propulsion units that help prevent the spinning and digging that occurs with a conventional wheel.

It is another object of the invention to provide a novel multi-terrain amphibious vehicle that is capable of traveling through mud, sand, rocks, swamps, snow and water.

It is also an object of the invention to provide a novel multi-terrain amphibious vehicle that has unlimited applications in fields such as forestry, agriculture, construction, mining, exploration, search and rescue, as well as a wide range of uses in recreational ATV vehicles.

It is another object of the invention to provide a novel multi-terrain amphibious vehicle that has an extremely low center of gravity due to the low profile drive system that also gives it excellent side hill stability.

It is an additional object of the invention to provide a novel multi-terrain amphibious vehicle that produces an extremely beneficial low ground pressure weight, due to the even weight distribution on its many cam-shaped wheels.

It is also an object of the invention to provide a novel multi-terrain amphibious vehicle having a tracking system that creates shallow cups in soft terrain rather than corrosion-starting ruts.

It is another object of the invention to provide a novel multi-terrain amphibious vehicle having a traction system that utilizes "the principle of caming" for propulsion in terrain by a stepping, caterpillar action.

It is also an object of the invention to provide a novel multi-terrain amphibious vehicle that has relatively high speed capability over roads and smooth surfaces.

The multi-terrain amphibious vehicle has an elongated longitudinally extending chassis that is effectively divided in half by an imaginary centerline. There are left side propulsion units and right side propulsion units supported beneath the respective left and right halves of the chassis. The propulsion units on their respective sides are longitudinally spaced from each other.

Each propulsion unit has a driven axle having an inner end, an outer end and a Y-axis. Each driven axle is supported by an inside support arm and an outside support arm that have their top ends connected to the chassis. A plurality of cam-shaped wheels are rigidly mounted on the driven axles and these wheels have a rotation axis that coincides with the Y-axis of the driven axles. Each cam-shaped wheel has a first perimeter segment having a mid-point, a second perimeter segment having a mid-point, and a third perimeter segment having a mid-point. The first perimeter segment has a substantially arcuate contour and the mid point of the first perimeter segment extends radially farther from the rotation axis than the respective mid-points of the second and third perimeter sections.

The drive power for the vehicle is preferably one or more internal combustion engines mounted on the chassis. There is power transmission structure connecting the drive shafts of the engine or engines to the driven axles of the respective left and right side propulsion units. In one embodiment, the power transmission structure takes the form of sprocket gears and chains that transmit the power therebetween. In a second embodiment, there would be hydraulic motors or pumps utilized on the drive shafts of the engine or engines and also on the driven axles.

DESCRIPTION OF THE DRAWINGS

FIG. 7 is a side elevation view of a first embodiment of the cam-shaped wheels;

FIG. 8 is a side elevation view of a second embodiment of the cam-shaped wheel;

FIG. 9 is a side elevation view of a third embodiment of the cam-shaped wheel;

DESCRIPTION OF THE PREFERRED EMBODIMENT

Figure 1:
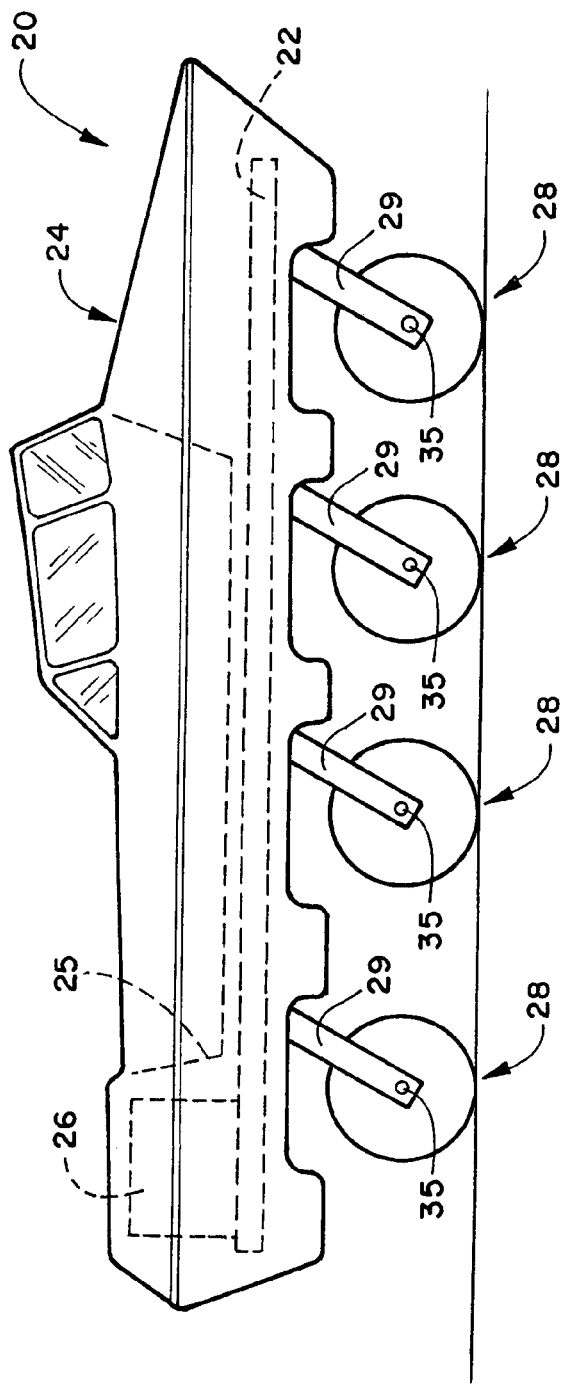
FIG. 1 is a schematic side elevation of the multi-terrain amphibious vehicle with the specific structure of the propulsion units and the power transmission structure not shown.

The novel multi-terrain amphibious vehicle will now be described by referring to FIGS. 1–12 of the drawings. The multi-terrain amphibious vehicle is generally designated numeral 20. FIG. 1 is a schematic side elevation view of vehicle 20 showing interior structure identified by dash—dash lines. It has an elongated chassis 22 having a vehicle body 24 mounted thereon. There is a passenger compartment 25 in vehicle body 24. One of the engines 26 is shown mounted on chassis 22. Four propulsion units 28 are schematically shown supported by outside axle support arms 29.

Figure 2:
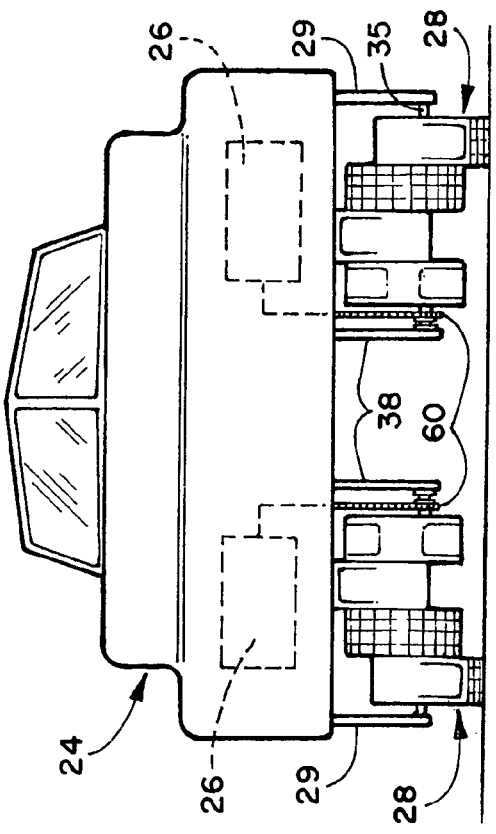
FIG. 2 is a rear elevation view of the multi-terrain amphibious vehicle showing one of the left side propulsion units and one of the right side propulsion units.
Figures 3, 4:
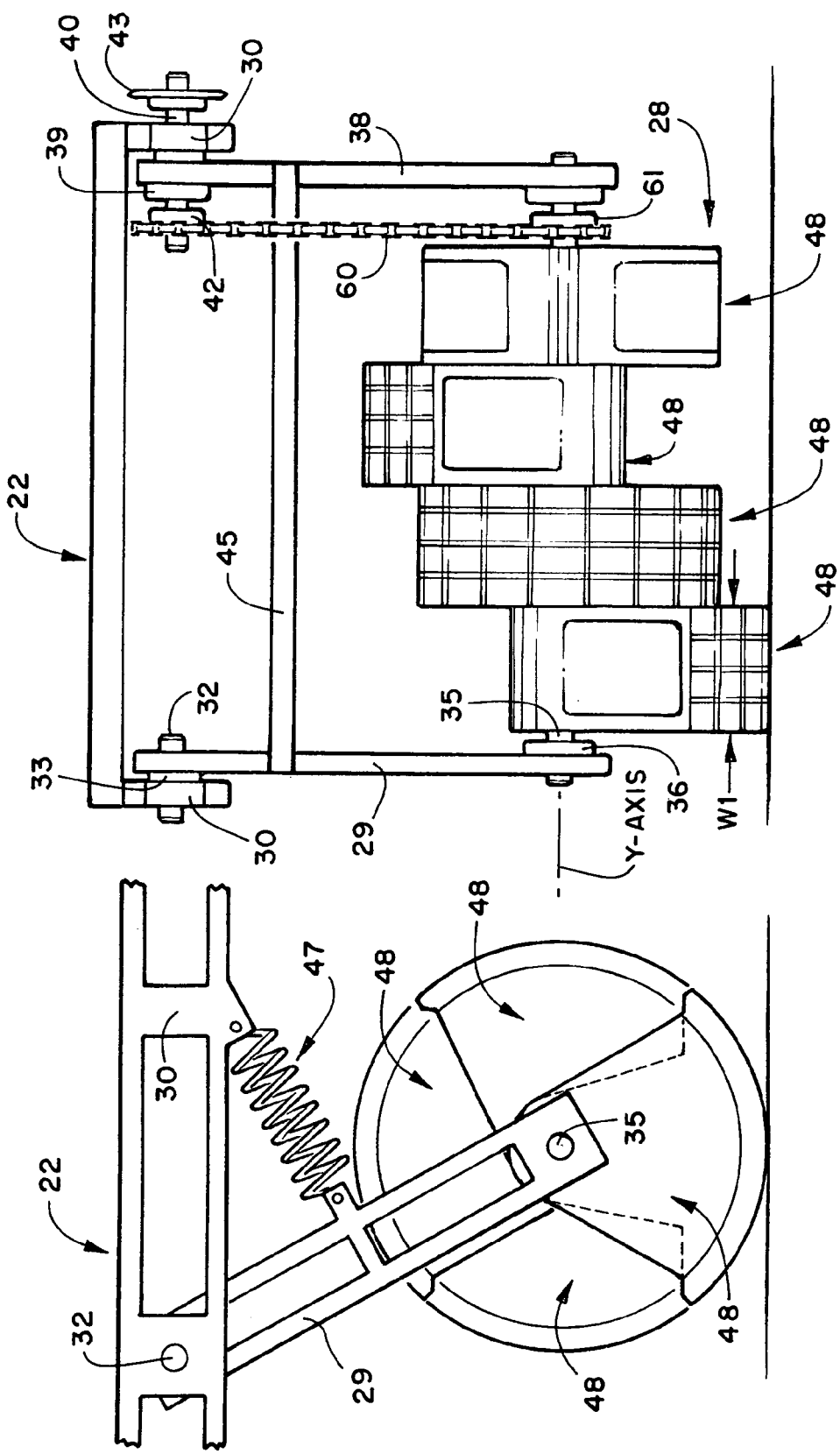
FIG. 3 is an enlarged rear elevation view illustrating how one of the propulsion units is supportably secured to a portion of the chassis of the multi-terrain amphibious vehicle.
FIG. 4 is a left side elevation view of FIG. 3.

The propulsion units 28 and their structure will be best understood by referring to FIGS. 2–4. FIG. 3 shows one of the left side propulsion units and its structure is identical to that of a right side propulsion unit but with the structure reversed. Chassis 22 can be a welded frame and it has downwardly extending framework 30. Chassis 22 could also take any other appropriate form. Outside axle support arm 29 has its top end rigidly secured on pivot pin 32 that is journaled in bearing 33 that is attached to framework 30. Driven axle 35 has its outer end journaled in bearing 36 that is secured to the bottom end of outside axle support arm 29. Inside axle support arm 38 has its top end secured to bearing 39 and a shaft 40 is journaled therein. The outside end of shaft 40 has a sprocket gear 42 rigidly secured thereto and inside sprocket gear 43 rigidly secured to the inside end of shaft 40. A cross member 45 has its opposite ends rigidly secured to the respective axle support arms 29 and 38. A shock absorber assembly 47 (schematically illustrated) has its one end connected to cross member 45 and its other end secured to chassis 22. A plurality of cam-shaped wheels 48 are rigidly secured on driven axle 35. The structure of the cam-shaped wheels will be discussed later but it is to be understood that they are sequentially oriented at a predetermined number of degrees to each other so that there is always one of the wheels in contact with the ground surface.

Figure 5:
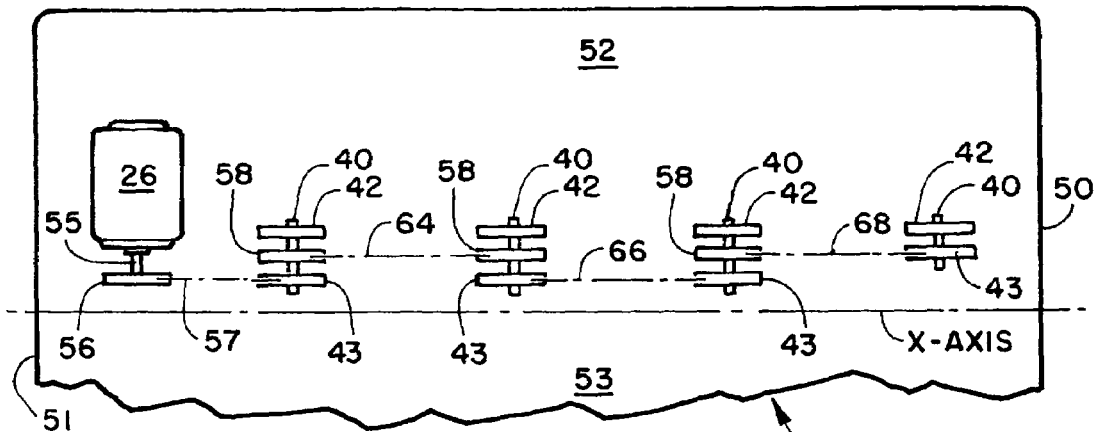
FIG. 5 is a schematic bottom plan view of the chassis of the multi-terrain amphibious vehicle showing a majority of the power transmission structure of the right half of the chassis.
Figure 6:
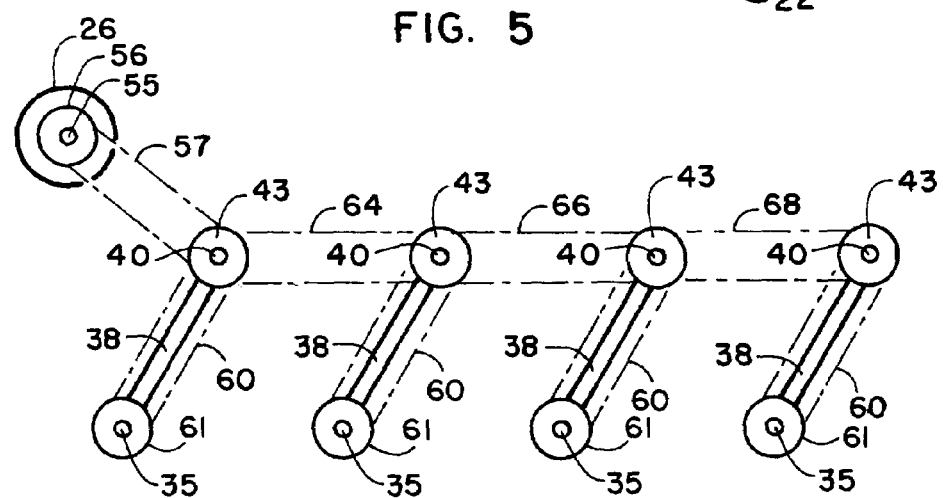
FIG. 6 is a schematic side elevation view illustrating the power transmission structure shown in FIG. 5.

FIGS. 5 and 6 should be referred to in order to understand one form of the power transmission structure from the engines 26 to the cam-shaped wheels 48. FIG. 5 is a schematic bottom plan view showing chassis 22 having a front end 50, a rear end 51, a right side 52 and a left side 53. The X-axis identifies an imaginary center line and only the structure on the left thereof will be discussed but it should be understood that there would be a similar structure to the right. The power source for the multi-terrain amphibious vehicle is preferably one or more internal combustion engines 26. It should be understood that other power sources such as electric motors might also be used in certain instances. Engine 26 has a driveshaft 55 having a sprocket gear 56 mounted thereon. A chain 57 passes around sprocket gear 56 and a sprocket gear 43 that is mounted on shaft 40 (see FIGS. 3 and 6). Sprocket gear 42 is mounted on the other end of shaft 40 (see FIG. 3) and there is an intermediate sprocket gear 58 also mounted on shaft 40. A chain 60 passes around sprocket gear 42 and sprocket gear 61 mounted on driven axle 35. As a result, the rotational motion from engine 26 rotates driven axle 35 causing the cam-shaped wheels to rotate about the Y-axis of driven axle 35. As intermediate sprocket gear 58 is rotated along with shaft 40, it drives a chain 64 that passes around the next sprocket gear 58 on the next shaft 40. This second shaft 40 also has an outside sprocket gear 42 that is connected to the top end of another inside axle support arm 38. The second inside sprocket gear 43 also rotates along with second shaft 40 and it has a chain 66 passing therearound that also passes around the next sprocket gear 43 on the next shaft 40. This shaft 40 also has a sprocket gear 42 that is supported at the top end of the next inside axle support arm 38. A central sprocket gear 58 is also mounted on this shaft 40 and it has a chain 68 passing therearound that also passes around a sprocket gear 43 on the next shaft 40. A sprocket gear 42 is also mounted on this shaft 40 and it is supported at the top end of another inside axle support arm 38. Engine 26 thus synchronously drives all four propulsion units 28 shown in FIG. 1. The number propulsion units used with the multi-terrain amphibious vehicle is a matter of choice or design determined by the use, size, etc. of the vehicle.

The steering of the multi-terrain amphibious vehicle could be accomplished by any conventional means. One preferred method is accomplished by using a braking system that is incorporated in each drive train. This allows independent backing of one side or the other at will. Their type of steering is referred to as "skid steering" and is used extensively in track vehicles. When using a single engine to drive both drive trains, a planetary differential can be used to both power transmitting and braking to be accomplished.

Different schematic embodiments of the cam-shaped wheels 48 are illustrated in FIGS. 7–9. The cam-shaped wheel in FIG. 7 is designated numeral 70. It has a width W1, a front wall 71, a rear wall 72 and a peripheral surface that extends entirely around the cam-shaped wheel. This outer surface has a first perimeter segment 74, a second perimeter segment 75 and a third perimeter segment 76. First perimeter segment 74 has a mid-point 78. Second perimeter segment 75 has a mid-point 79. Third perimeter segment 76 has a mid-point 80. Cam-shaped wheel 70 has an axle aperture 82 having a Y-axis that passes between front wall 71 and rear wall 72. A groove 83 is formed in aperture 82 for receiving a key 84 that would rigidly lock the cam-shaped wheel onto its driven axle 35. First perimeter segment 74 has a substantially arcuate contour and said mid-point 78 extends radially farther from said Y-axis than the mid-points of the respective second and third perimeter segments. In this particular embodiment, the first perimeter segment 74 encompasses approximately 190 degrees around the Y-axis so that only two cam-shaped drive wheels would be necessary to complete a set that would always have part of the outer peripheral surface in contact with the ground. A pair of cavities 86 are formed in the respective second and third perimeter segments and they function as a water propulsion paddle when the vehicle is traveling upon the top surface of a body of water. A rubber tread 88 having grooves 89 is formed on the entire outer surface of first perimeter segment 74. In FIG. 8 similar structure is designated the same numerals as in FIG. 7 except that a single prime notation (') is part of the identification. In FIG. 9 a double prime notation (") is used with the same numbers. The first perimeter segment 74' in FIG. 8 encompasses approximately 130 degrees. Therefore three cam-shaped drive wheels 70' would be used to have a complete set on a driven axle. In FIG. 9, the first perimeter segment 74" encompasses approximately 100 degrees. Therefore four cam-shaped wheels 70" would be used to complete a set on a driven axle.

Figure 10:
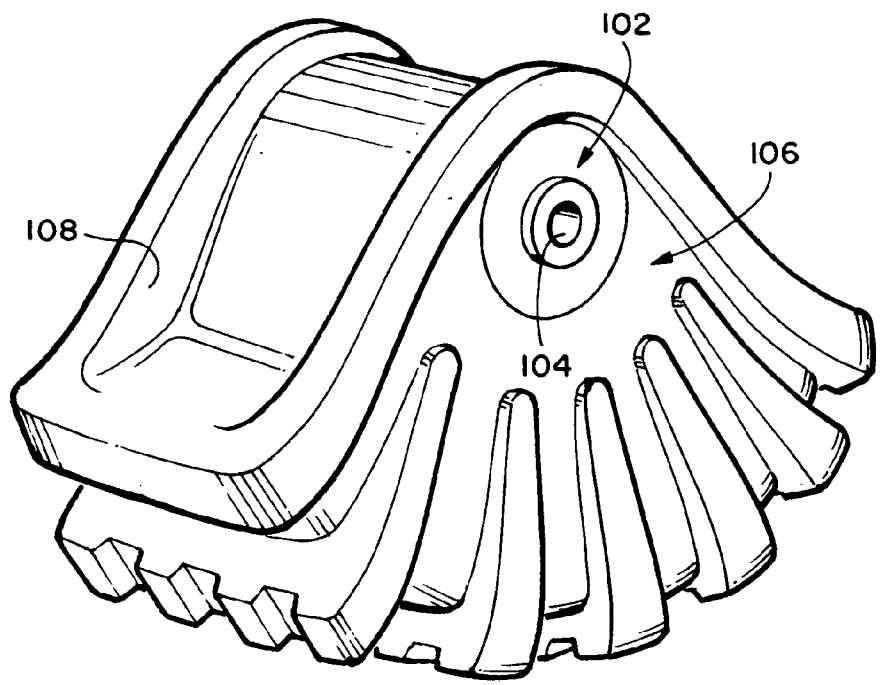
FIG. 10 is a front perspective view illustrating the form that a functional cam-shaped wheel could take.
Figure 11:
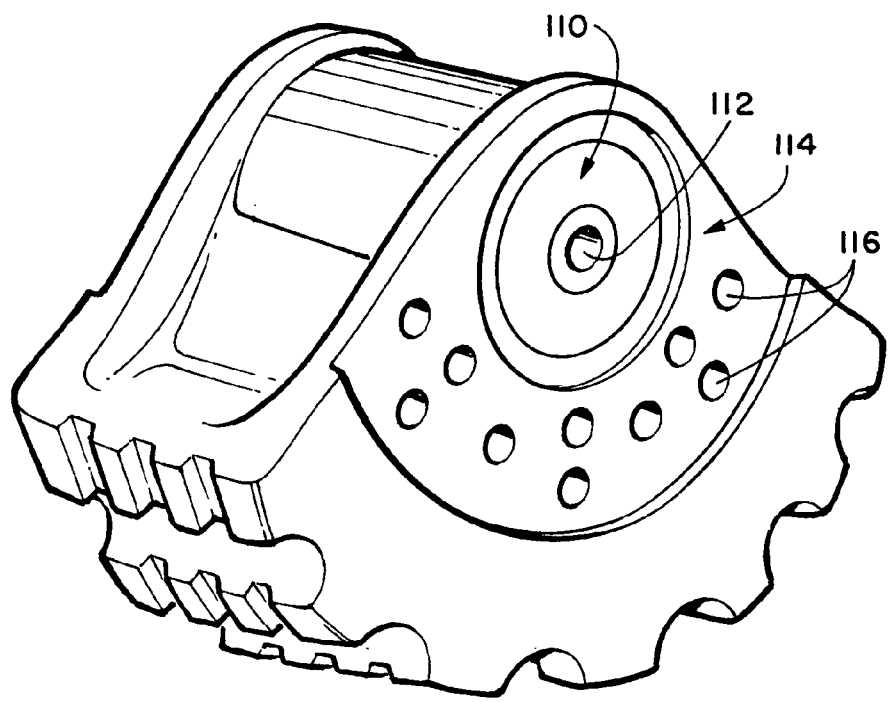
FIG. 11 is a front perspective view illustrating an alternative form that functional cam-shaped wheel could take.

FIGS. 10 and 11 illustrate the form that actual cam-shaped wheels might take. In FIG. 10 a cam-shaped rim 102 is shown and it would preferably be made of steel or aluminum. It has a bore hole 104 that would allow it to be mounted on a driven axle 35. A custom made molded cam-shaped rubber tire 106 would be mounted on rim 102. Inverted paddles 108 would be molded into the rubber section of the wheel. The preferred rubber to be used in the cam-shaped tires would be made of the rubber that is used in the new semi-pneumatic tire technology. Any desired tread design could be used as well as having an air cushioned ride along with being flat-proof. FIG. 11 shows a rim 110 having an axle bore hole 112. A cam-shaped tire 114 would be mounted on rim 114. Tire 114 is shown to have a plurality of transversely extending bore holes that pass entirely through the width of the tire. This allows the tire to be compressed travel to produce a softer ride.

Figure 12:
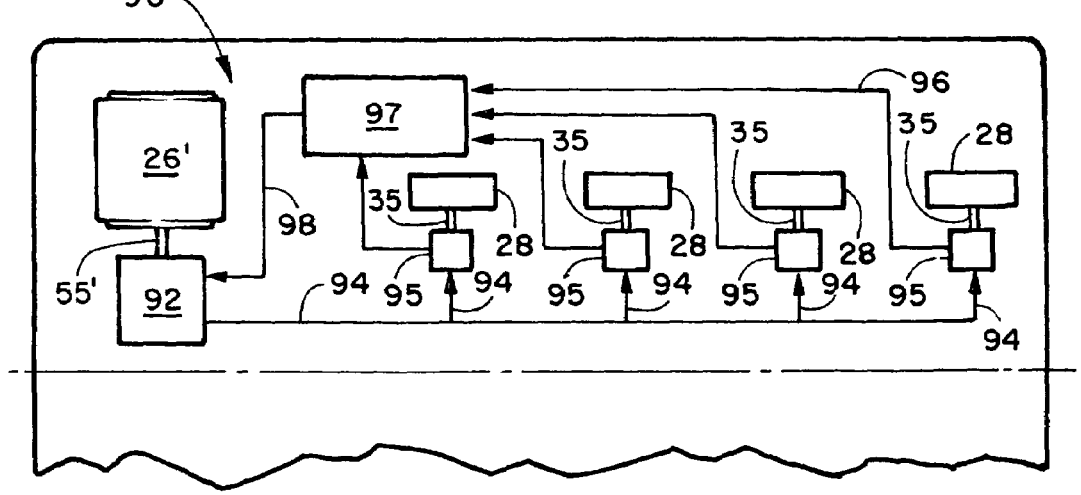
FIG. 12 is a partial schematic view of a first alternative embodiment of a power transmission structure utilizing hydraulic pumps.

FIG. 12 illustrates a first alternative power transmission structure 90 having an engine 26' that has a drive shaft 55'. A primary hydraulic pump or motor 92 is mounted on driveshaft 55'. A plurality of hydraulic fluid hoses 94 are connected to secondary hydraulic pumps 95 on each of the driven axles 35. Return hydraulic lines 96 (not always shown) travel from each of the individual secondary hydraulic pumps to a reservoir 97 that is connected by another hydraulic hose 98 to the principal hydraulic pump 92.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended Claims.

The invention claimed is:

1. A multi-terrain amphibious vehicle comprising:
an elongated longitudinally extending chassis having a front end, a rear end, a left side, a right side, a centerline, a bottom surface and a top surface;
at least two left side propulsion units and at least two right side propulsion units;
said left side propulsion units being longitudinally spaced from each other;
said right side propulsion units being longitudinally spaced from each other;
each of said left side propulsion units and said right side propulsion units comprising:
(a) support means for each of said propulsion units on said bottom surface of said chassis comprising: a pair of laterally spaced longitudinally extending framework members secured to said bottom surface of said chassis; one of said framework members being an inside framework member and said other framework member being an outside framework member, said framework member being spaced from each other a distance greater than the width of said propulsion unit;
(b) a driven axle having an inner end, an outer end and a Y-axis,
c) first support means connected to said chassis for supporting said inner end of said driven axle,
(d) second support means connected to said chassis for supporting said outer end of said driven axle,
(e) at least two cam-shaped wheels mounted on said driven axle; each cam-shaped wheel having a rotation axis that coincides with said Y-axis of said driven axle; each cam-shaped wheel having a first perimeter segment having a mid-point a second perimeter segment having a mid-point and a third perimeter segment having a mid-point; said first perimeter segment having a substantially arcuate contour and said mid-point of said first perimeter segment extends radially farther from said rotation axis than said mid-points of said second and third perimeter segments;
(f) said second support means having an elongated outside axle support arm having a top end and a bottom end; a transversely extending outside pivot pin having an inner end and an outer end; said inner end being rigidly secured to said outside axle support arm adjacent said top end of said outside axle support arm; said outer end of said outside pivot pin being journaled in a bearing attached to said outside framework member;
said bottom end of said outside axle support arm having a bearing attached thereto in which said outer end of said driven axle is journaled;
(g) said first support means having an elongated inside axle support arm having a top end and a bottom end; a transversely extending driveshaft having an inner end and an outer end; an inside sprocket gear is rigidly mounted on said driveshaft adjacent said inner end, said driveshaft is journaled in a bearing attached to said inside framework member with said outer end having a top end sprocket gear rigidly secured thereto;

said bottom end of said inside axle support arm having a bearing attached thereto in which said inner end of said driven axle is journaled; a bottom end sprocket gear is rigidly secured to said driven axle of said propulsion unit and said bottom end sprocket gear is in vertical alignment with said top end sprocket gear and a chain passes around said respective top end and bottom end sprocket gears;

(h) drive power means mounted on said chassis; and (I) power transmission means connecting said drive power means to said driven axles of said respective left and right side propulsion units.

2. A multi-terrain amphibious vehicle as recited in claim 1 further comprising a vehicle body mounted on said chassis.

3. A multi-terrain amphibious vehicle as recited in claim 2 wherein said vehicle body has a passenger compartment.

4. A multi-terrain amphibious vehicle as recited in claim 1 wherein said vehicle body is a buoyant structure that allows said vehicle to travel upon the top of a body of water.

5. A multi-terrain amphibious vehicle as recited in claim 2 wherein said propulsion units extend transversely beneath said bottom surface of said chassis to a position near said center line of said chassis.

6. A multi-terrain amphibious vehicle as recited in claim 1 wherein there are at least three left side propulsion units and at least three right side propulsion units.

7. A multi-terrain amphibious vehicle as recited in claim 1 wherein there are at least four left side propulsion units and at least four right side propulsion units.

8. A multi-terrain amphibious vehicle as recited in claim 1 wherein each of said propulsion units comprises at least three cam-shaped wheels mounted on said driven axles.

9. A multi-terrain amphibious vehicle as recited in claim 1 wherein each of said propulsion units comprises at least four cam-shaped wheels mounted on said driven axles.

10. A multi-terrain amphibious vehicle as recited in claim 1 wherein at least one of said second or third perimeter segments of said cam-shaped wheels has a cavity formed therein that functions as a water propulsion paddle when said vehicle is traveling upon the top surface of a body of water.

11. A multi-terrain amphibious vehicle as recited in claim 1 wherein both said second and third perimeter segments of said cam-shaped wheels have a cavity formed therein that functions as a water propulsion paddle when said vehicle is traveling on the top surface of a body of water.

12. A multi-terrain amphibious vehicle as recited in claim 1 wherein said cam-shaped wheels of each propulsion unit are rigidly connected to said driven axle to form an assembled structure in which there is always a first segment of one of said cam-shaped wheels oriented to contact a ground surface during each 360 degrees of rotation of said driven shaft.

13. A multi-terrain amphibious vehicle as recited in claim 1 further comprising shock absorber means connected between said respective inside and outside support arms and said chassis for cushioning the ride of said vehicle over rough terrain.

14. A multi-terrain amphibious vehicle as recited in claim 1 wherein said drive power means comprises at least one internal combustion engine.

* * * * *